(12) United States Patent
Chung

(10) Patent No.: US 7,706,088 B2
(45) Date of Patent: Apr. 27, 2010

(54) VOICE COIL TYPE LENS DRIVE ASSEMBLY

(76) Inventor: Huang Tien Chung, 424-16, Chang Yun Road, Hwa-Tang Country, Chang-Twa (TW)

( * ) Notice: Subject to any disclaimer, the term of this patent is extended or adjusted under 35 U.S.C. 154(b) by 0 days.

(21) Appl. No.: 12/103,966

(22) Filed: Apr. 16, 2008

(65) Prior Publication Data

US 2008/0259470 A1    Oct. 23, 2008

(30) Foreign Application Priority Data

Apr. 19, 2007    (JP)    ............... 2007-110215

(51) Int. Cl.
G02B 7/02    (2006.01)
(52) U.S. Cl. ........................ 359/823; 359/824
(58) Field of Classification Search ......... 359/819–824, 359/814
See application file for complete search history.

(56) References Cited

U.S. PATENT DOCUMENTS 4,596,444 A * 6/1986 Ushida ..................... 359/813
4,828,360 A * 5/1989 Maruyama ................ 359/824
6,278,844 B1* 8/2001 Takeshita .................. 396/85

FOREIGN PATENT DOCUMENTS

JP        3-12606       2/1991
JP        2006-201525   8/2006

* cited by examiner

Primary Examiner—Mohammed Hasan
(74) Attorney, Agent, or Firm—McGlew and Tuttle, P.C.

(57) ABSTRACT

A lens drive assembly includes a pair of electrically conductive springs (2) disposed on the base (1), a metallic yoke (6) disposed on the electrically conductive springs (2), magnets (5) mounted within the yoke (6), a movable unit (M1) inserted into the yoke, a leaf spring (7) disposed on the yoke (6), and an upper cover frame (8) coupled to the base (1) while being superimposed on the leaf spring (7). The conductive springs (2) include spring body (2b), spring piece (2a) and a spring wire. The spring wire has U-turn curvilinear portions connected between the outer spring body (2b) and the spring piece (2a) in a sole plane. The leaf spring (7) has a spring frame (7a), a thin circular spring ring (7b), and a spring wire. The spring wire has U-turn curvilinear portions between the spring frame (7a) and the spring ring in a sole plane.

2 Claims, 14 Drawing Sheets

(C)

(A)

(B)

(A)

(B)

(A)

(B)

(A)

(B)

(A)

(B)

(A)

(B)

VOICE COIL TYPE LENS DRIVE ASSEMBLY

BACKGROUND OF THE INVENTION

1. Field of the Invention

The present invention relates to a voice coil type lens drive assembly for adjusting the focus of a lens by utilizing a repulsive magnetic force which a magnetic field created upon energization of a coil induces between the coil and a fixed magnet opposed to the coil.

2. Description of the Related Art

Heretofore, in connection with a voice coil type lens drive assembly for adjusting the focus of a lens by utilizing a repulsive magnetic force which a magnetic field created upon energization of a coil induces between the coil and a fixed magnet opposed to the coil, a spring for returning a movable unit to an initial position has been known as is disclosed, for example, in Patent Literatures 1 and 2.

In the spring disclosed in Patent Literature 1 (Japanese Patent Laid-Open Publication No. 2006-201525, see FIG. 1 and paragraph 0031), as shown in FIG. 17, thin spring wires 125 are formed between an inner periphery-side end 109a and an outer periphery-side end 109b to constitute elastic portions.

In the spring disclosed in Patent Literature 2 (Japanese Registered Utility Model No. 312606, see FIG. 3), as shown in FIG. 18, the outside of a spring 150 is attached to a fixed frame, while the inside of the spring 150 is attached to a movable unit, and U-bent portions 53 are formed therebetween to constitute elastic portions.

Although the above conventional springs do not involve any functional effect, it is desired to remedy the following inconvenience.

In the spring disclosed in Patent Literature 1, as shown in FIG. 17, in case of forming elastic portions 125, 131, 128 and 130, since the elastic portions are formed between the inner periphery-side end 109a and the outer periphery-side end 109b, an outline of the entire assembly becomes large and it is difficult to apply the construction in question to a downsized lens drive assembly.

The spring 150 disclosed in Patent Literature 2, which is shown in FIG. 18, has been proposed to improve the elastic portions of the spring disclosed in Patent Literature 1. In the spring 150, U-bent portions 153 are formed between the outside and the inside to constitute elastic portions by utilizing narrow spaces formed between four square corners and a circular lens barrel. Therefore, the paths of the elastic portions are short, resulting in that the spring elastic modulus is large and this spring characteristic causes a large change in the lens controlling drive force. This is not desirable and gives rise to the problem that a higher accuracy than necessary is required for controlling the lens position.

The above conventional constructions further involve the problem that when the lens moves against the bias of the spring, there occurs an offset in a peculiar direction due to characteristics induced by the shape of the spring. That is, when the spring expands or contracts, the lens moves while being pulled in the expanding or contracting direction, i.e., inwards or outwards, with the result that tilting of the lens is apt to occur.

More particularly, in the construction disclosed in Patent Literature 1 and shown in FIG. 17, the positions of connections 128 and 130 are different in the circumferential direction, so that in operation, a force acting in a rotational direction is exerted on the lens. In paragraph 0031 of Patent Literature 1 it is described that the arcuate connections 128 and 130 are each in an arcuate shape of a half or more of a circle and are therefore easy to undergo an elastic deformation and absorb stress. Actually, since the portions in question are close to both inner and outer peripheries, there is the problem that forced oscillation is apt to occur due to deformation of the portions in question and that with the resulting resonance phenomenon, the oscillation in the rotational direction is difficult to be damped.

In the case of the spring 150 disclosed in Patent Literature 2 and shown in FIG. 18, the lens is pulled in an expanding or contracting direction of the spring and hence tilting of the lens is apt to occur. Consequently, a frictional force acts on the sliding portion as the lens moves, and when the magnetic driving force becomes weak at the end of the movement, it undesirably ends up with a larger elastic modulus.

That is, a lens unit starts operating from a position offset in a different direction, depending on in what attitude the photographing device concerned is used. Just after energization of a coil and hence start of operation, the motion of the lens system involves a peculiar oscillation under the influence of the magnetic force created between the magnet and coil as a drive source, a relative distance between the two or a coefficient of friction with a contacted slide portion at an offset position.

The oscillation system of the lens unit differs depending on the moving speed and weight of the lens unit, so in order to attenuate the turning motion of the lens unit quickly in correspondence to a change in damped state of the resonance phenomenon of the lens system it is necessary to change the state of absorption of the oscillation system.

BRIEF SUMMARY OF THE INVENTION

It is an object of the present invention to solve the above-mentioned problems and provide a voice coil type lens drive assembly for adjusting a focus of a lens, the lens drive assembly not requiring a higher lens position control accuracy than necessary, hard to cause an offset during lens movement and applicable also to a downsized lens drive assembly.

According to the present invention, for solving the above-mentioned problems, there is provided a voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising a lower base, an electrically conductive spring disposed on the base, a metallic yoke disposed on the electrically conductive spring, magnets mounted within the yoke, a movable unit inserted into the yoke in opposition to the magnets, a leaf spring disposed on the yoke, and an upper cover frame coupled to the base while being superimposed on the leaf spring, the electrically conductive spring comprising an outer spring body, a thin spring piece formed inside the spring body, and a spring wire, the spring wire comprising a curvilinear portion connected at one end to the inner spring piece and repeating U-turn and another curvilinear portion connected at an opposite end to the outer spring body and repeating U-turn, the two curvilinear portions being disposed at a mutually intersecting angle, the leaf spring comprising a thin quadrangular spring frame located on an outer edge side, a thin circular spring ring located on an inner edge side, and a spring wire, the spring wire comprising a curvilinear portion connected at one end to the spring ring and repeating U-turn and another curvilinear portion connected at an opposite end to the spring frame and repeating U-turn.

In the voice coil type lens drive assembly described in claim 1, the electrically conductive spring comprises an outer spring body, a semicircular thin spring piece formed inside the spring body, and a spring wire, the spring wire comprising a curvilinear portion connected at one end to the inner spring piece and repeating U-turn and another curvilinear portion connected at an opposite end to the outer spring body and repeating U-turn, and the leaf spring comprises a thin quadrangular spring frame located on an outer edge side, a thin circular spring ring located on an inner edge side, and a spring wire, the spring wire comprising a curvilinear portion connected at one end to the spring ring and repeating U-turn and another curvilinear portion connected at an opposite end to the spring frame and repeating U-turn. According to this construction, a higher accuracy than necessary is not required for controlling the lens position and it becomes possible to provide a voice coil type lens drive assembly for adjusting the focus of a lens which assembly is applicable also to a downsized lens drive assembly.

Thus, according to the present invention, the paths of the springs as elastic members are each taken as long as possible within a limited space and the springs are each formed in a shape which does not cause any directional offset upon displacement of the lens, thereby making the elastic modulus of the spring small and preventing the spring characteristic from causing a large change of the lens controlling drive force. Consequently, it is possible to provide a voice coil type lens drive assembly hard to cause an offset in lens movement and exhibiting an extremely good performance.

DETAILED DESCRIPTION OF THE INVENTION

Figure 1:
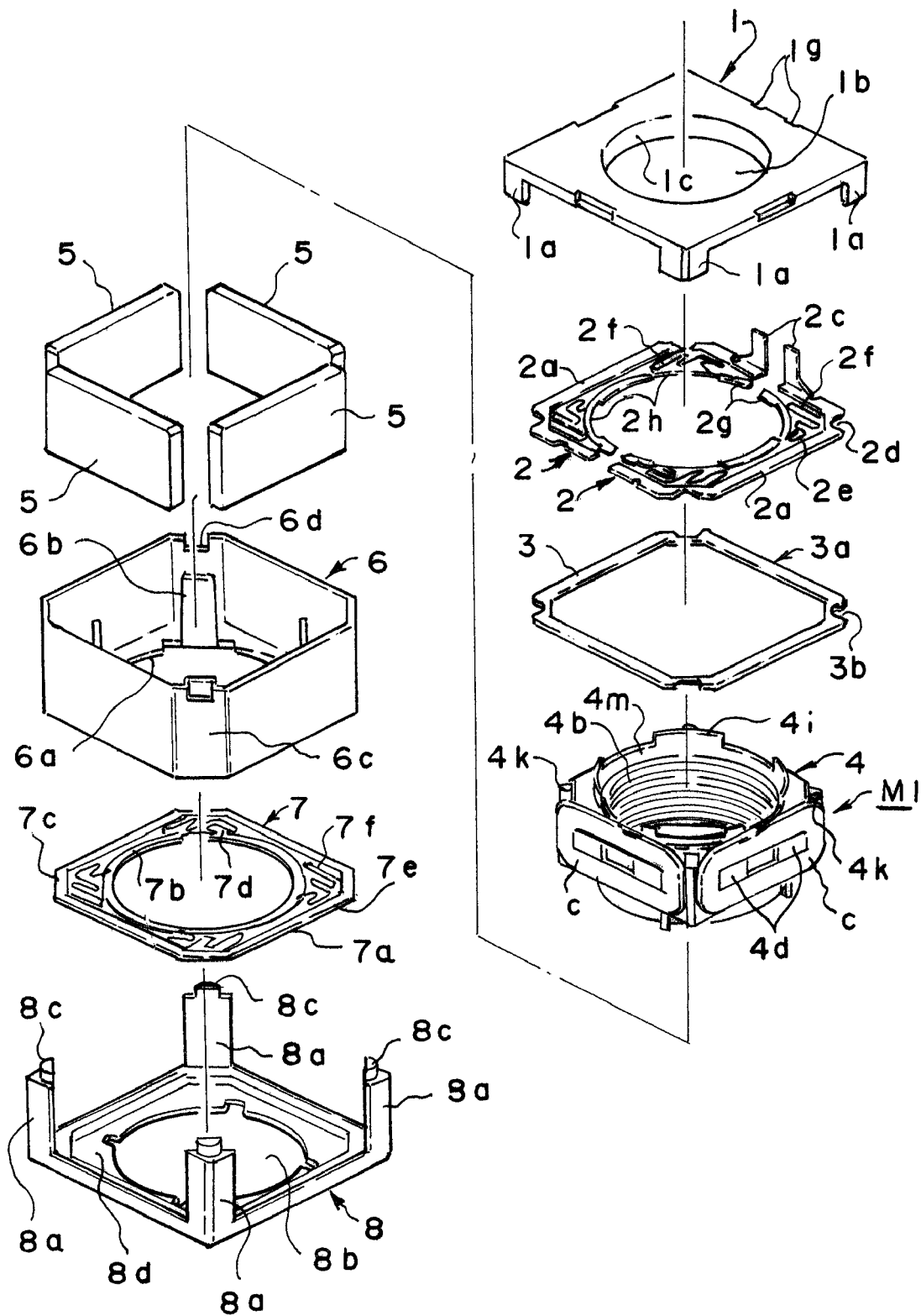
FIG. 1 is an exploded perspective view of a voice coil type lens drive assembly according to an embodiment of the present invention.

An embodiment of the present invention will be described in detail with reference to the drawings. As shown in FIG. 1, a voice coil type lens drive assembly using a motor is constituted by stacking within a cover frame 8 a leaf spring 7, a yoke 6, magnets 5, a coil base 4, a washer 3, electrically conductive springs 2 and a base 1 in this order. In the exploded perspective view for assembly of FIG. 1, as is seen from FIG. 2, the cover frame 8 to be positioned on an upper side is placed below and the components which should underlie the cover frame 8 are assembled successively upwards.

Figure 2:
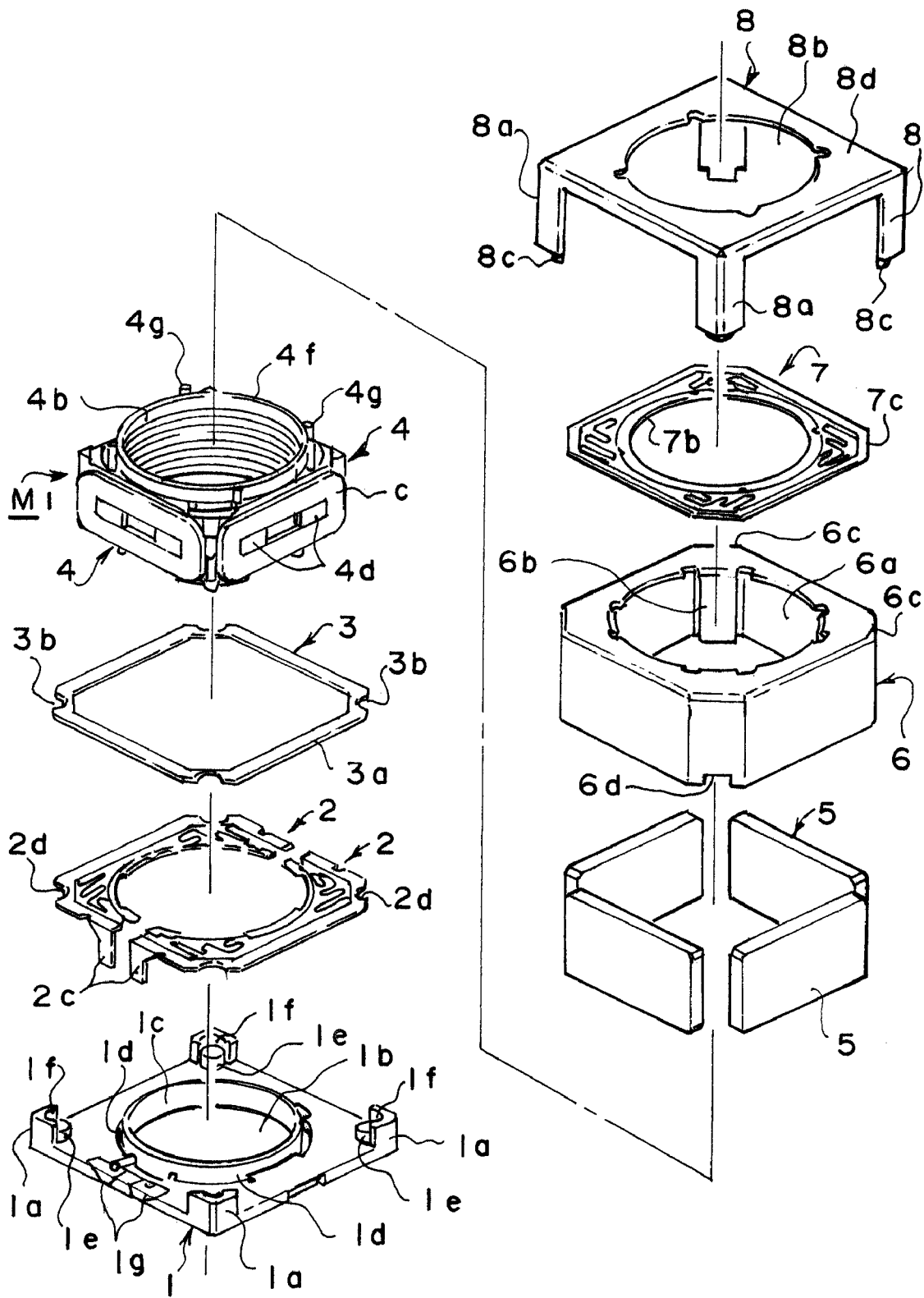
FIG. 2 is an exploded perspective view resulting from viewing the arrangement of FIG. 1 in the opposite direction.
Figure 3:
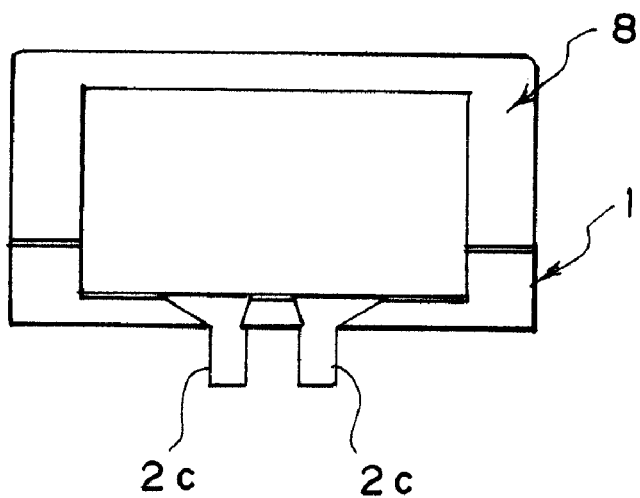
FIGS. 3(A), 3(B) and 3(C) are a plan view, a right side view and a rear view, respectively, of the voice coil type lens drive assembly of the embodiment.
Figure 3:
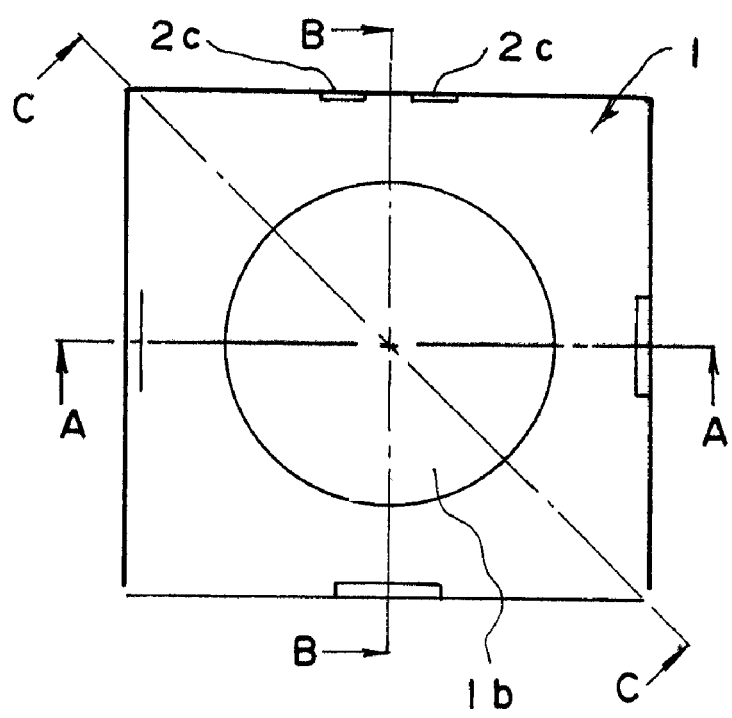
Figure 3:
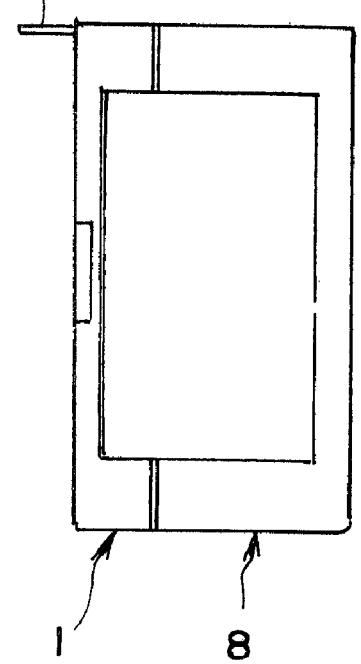

As shown in FIG. 2, the base 1 includes a body which is formed by molding into a quadrangular plate shape with use of a synthetic resin, and four support rods 1a projecting upwards are formed on the four corners of the body. A lens aperture 1b is formed centrally of the body and a cylindrical guide 1c is erected along a peripheral edge of the lens aperture.

Cutout portions 1g are formed in one side of the body.

Figure 8:
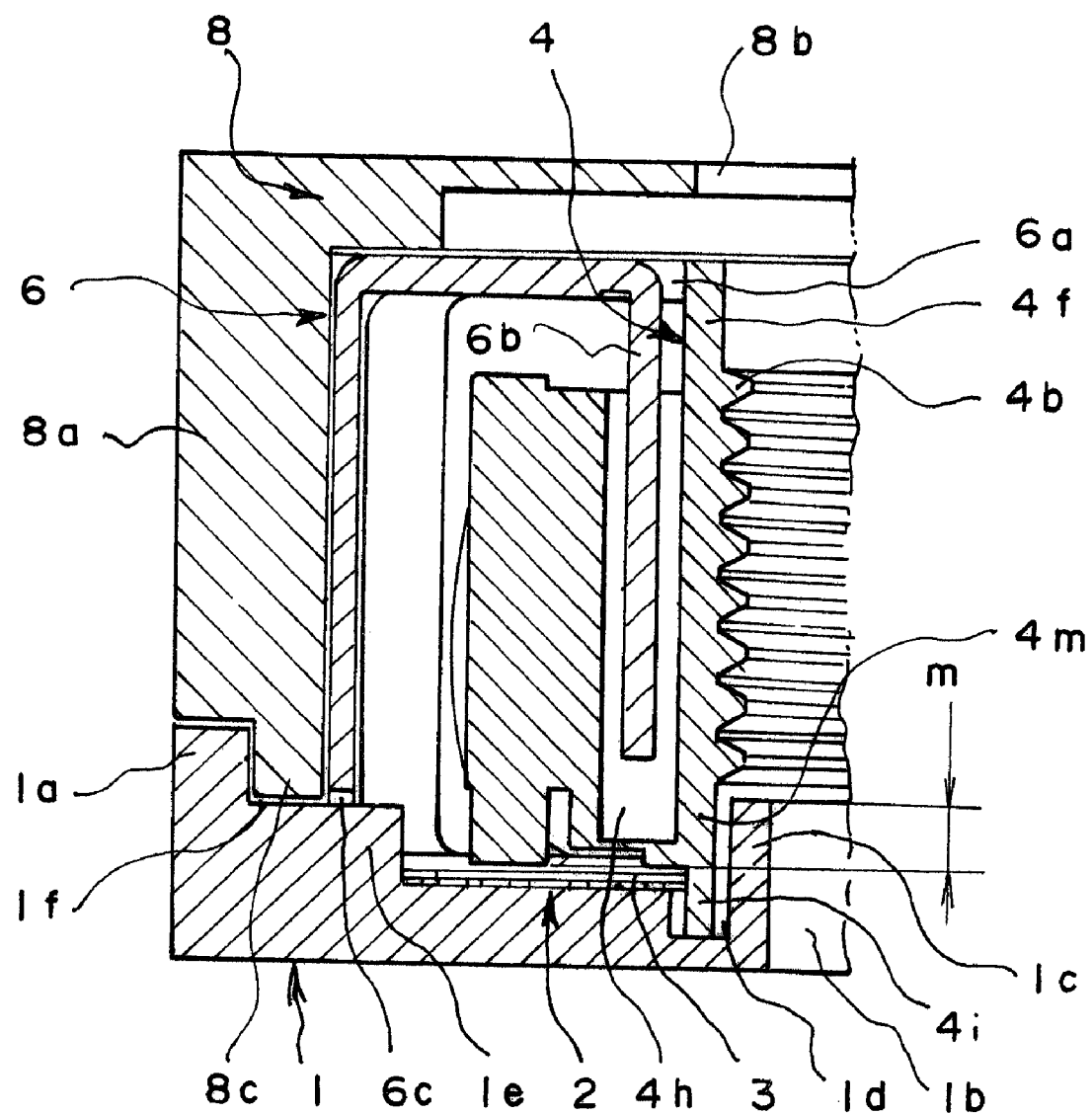
FIG. 8 is a partial enlarged sectional view of FIG. 6.
Figure 13:
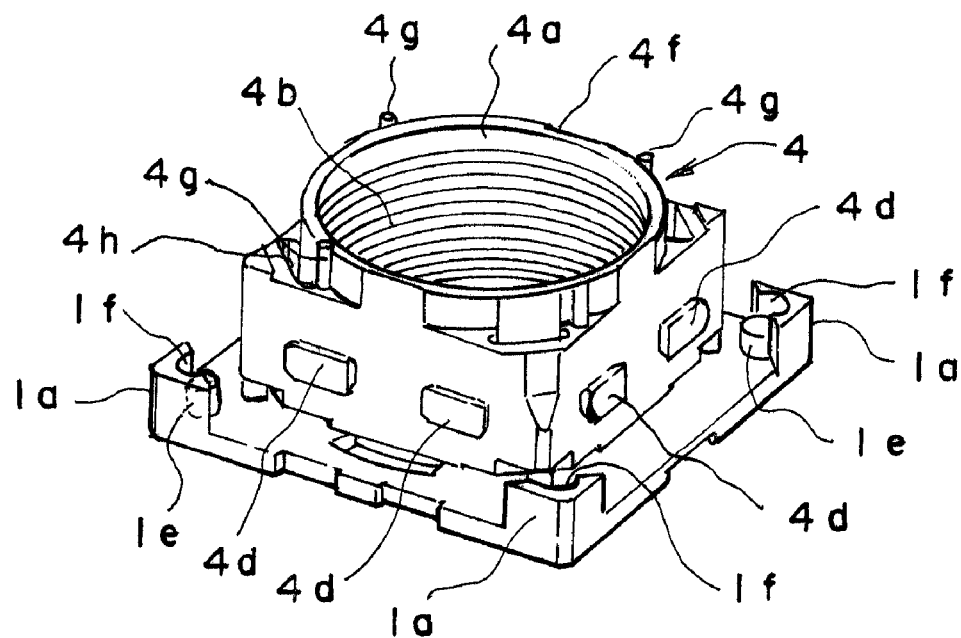
FIG. 13 is a perspective view showing an assembled state of the coil base to the base.
Figure 14:
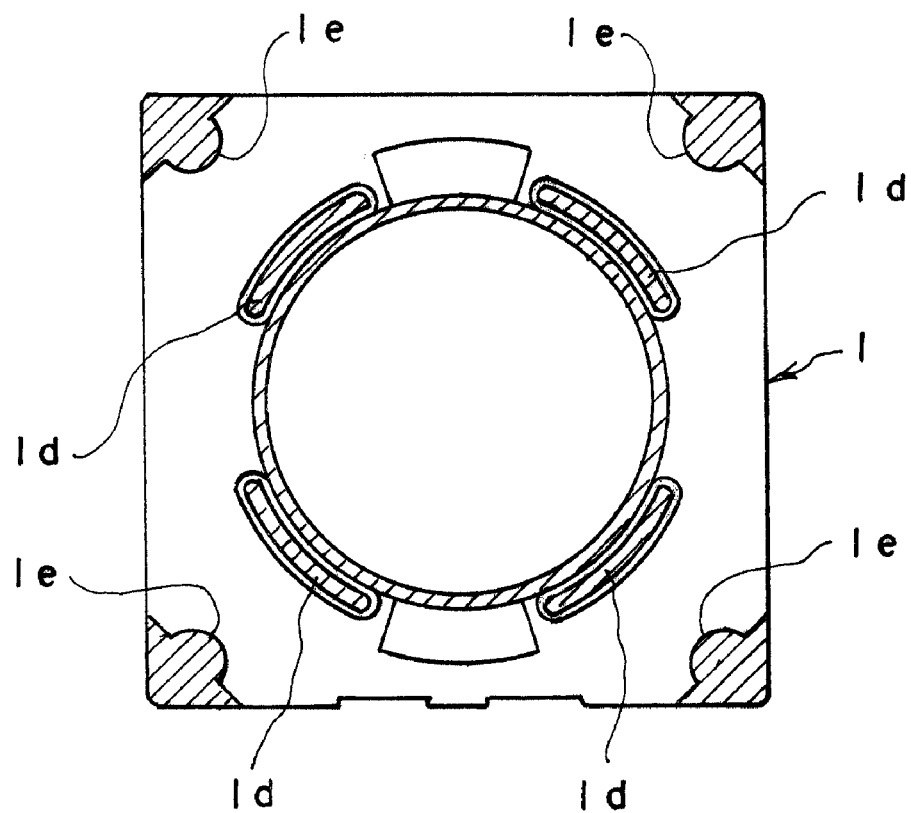
FIG. 14 is a plan view in cross section of the base.

As shown in FIGS. 8, 13 and 14, four arcuate and somewhat deep grooves 1d are formed at equal intervals outside a base portion of the cylindrical guide 1c. Further, semicircular projections 1e are formed on inside base portions of the support rods 1a and semicircular recesses 1f are formed continuously on the upper side with the projections 1e, the recesses 1f biting into inner peripheries of the support rods 1a.

Figure 11:
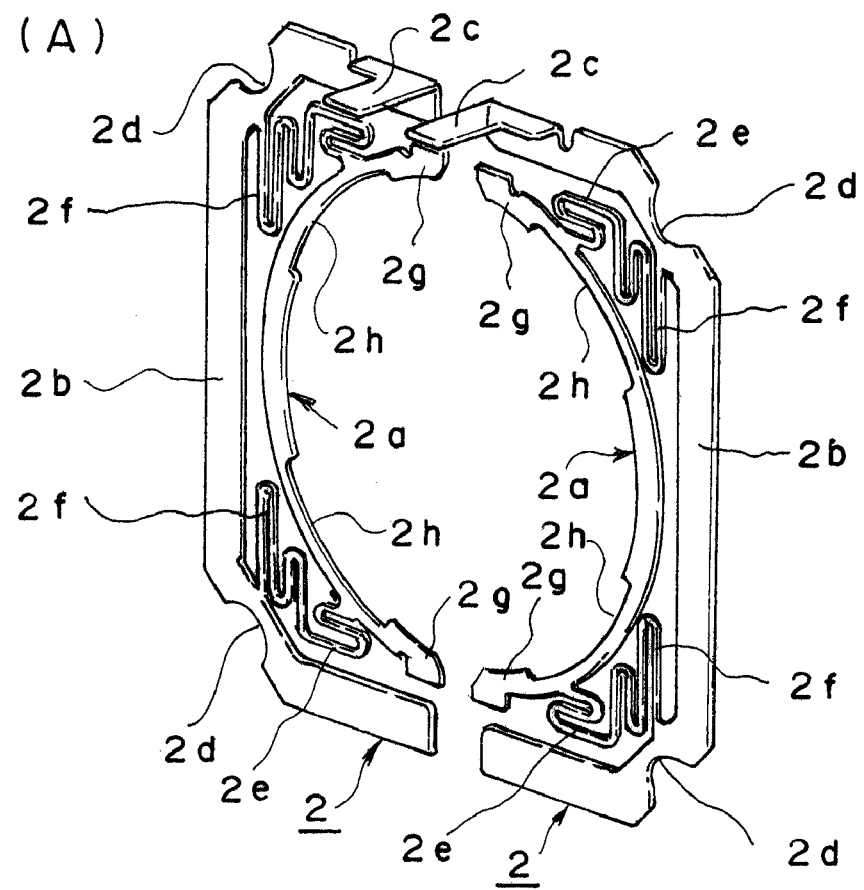
FIG. 11(A) is a perspective view of an electrically conductive spring and FIG. 11(B) is a partial enlarged perspective view thereof.
Figure 11:
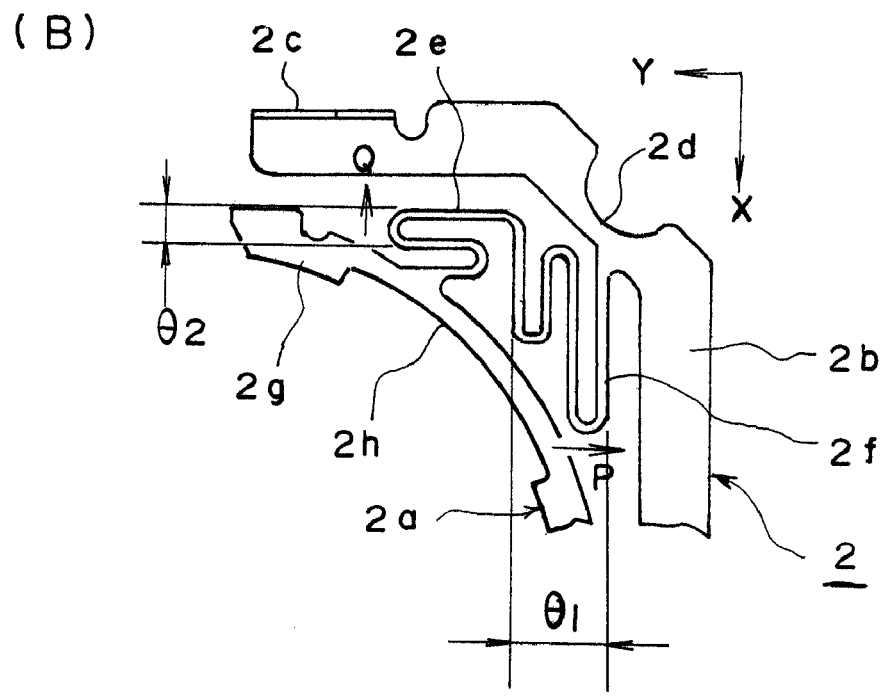

The electrically conductive springs 2 are each formed by a thin plate of a material having electrical conductivity and superior in resilience, e.g., phosphor bronze. As the electrically conductive springs 2 there are used a pair of leaf springs disposed symmetrically right and left in opposition to each other. As shown in FIGS. 11(A) and 11(B), the electrically conductive springs 2 are each formed by an outer laterally-facing U-shaped spring body 2b and a semicircular thin spring piece 2a formed inside the spring body 2b. At one end of the outer spring body 2b is formed an L-bent support piece 2c and 45° chamfered and bent recesses 2d are formed in two outer corners of the spring body 2b.

The inner spring piece 2a and the outer spring body 2b are connected together through thin resilient wires. The resilient wires are each made up of a horizontal curvilinear portion 2e connected at one end thereof to the inner spring piece 2a and repeating U-turn and a vertical curvilinear portion 2f connected at an opposite end thereof to the outer spring body 2b and repeating U-turn. The curvilinear portion 2e connected at one end thereof to the inner spring piece 2a and repeating U-turn and the curvilinear portion 2f connected at the opposite end to the outer spring body and repeating U-turn are disposed so as to cross each other at an angle of 90° in a sole (single) plane for example. That is, with respect to one horizontal curvilinear portion 2e the other vertical curvilinear portion 2f is displaced 90° and is connected in this state to the curvilinear portion 2e.

Further, both end portions 2g of the inner semicircular spring piece 2a are formed in a grooved hook shape for mounting thereto of terminals of coils C to be described later. Likewise, grooved guide portions 2h for mounting to the coil base 4 are formed in two upper and lower positions of the inner periphery of each spring piece 2a.

Although in this embodiment the electrically conductive springs 2 are formed in a bisected manner, they may be formed as an integral construction. In this case, one conductive terminal is drawn out from the leaf spring 7.

The washer 3 is constituted by a thin film formed of an electrically insulating material. As shown in FIGS. 1 and 2, the washer 3 is formed in the shape of a quadrangular frame 3*a* and small arcuate recesses 3*b* are formed in four outer corner portions of the frame 3*a*.

Figure 9:
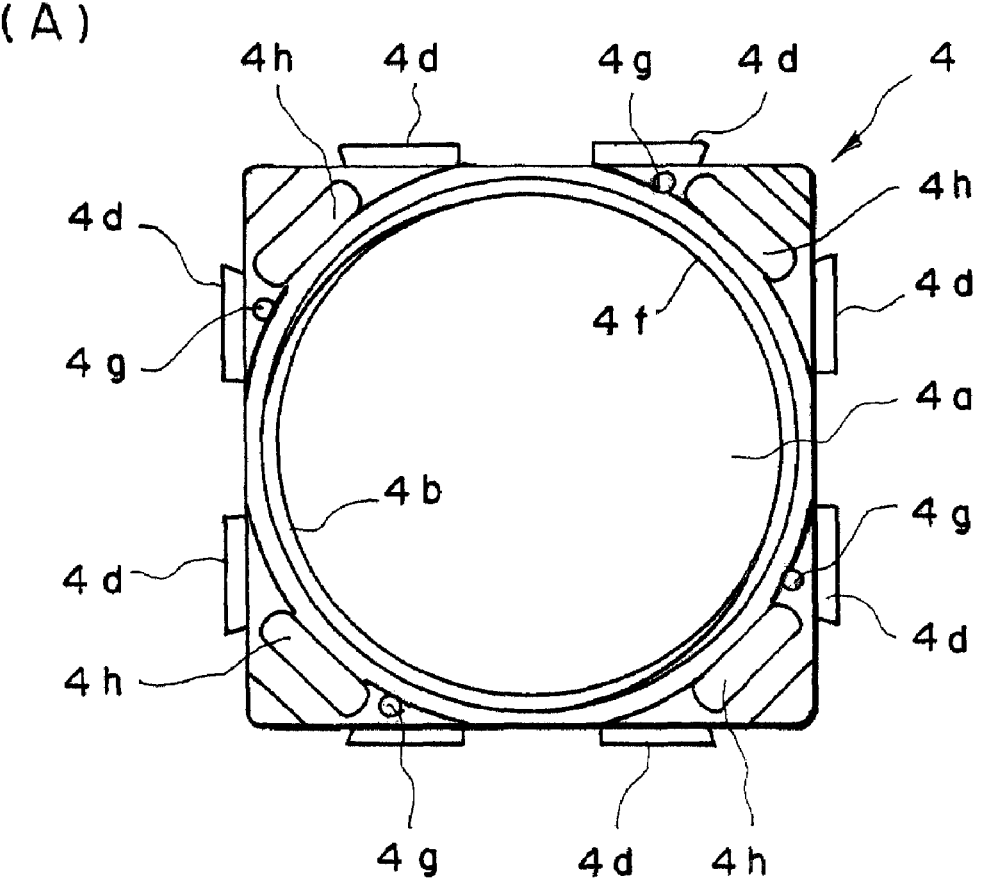
FIG. 9(A) is a plan view of a coil base and FIG. 9(B) is a right side view of the coil base.
Figure 9:
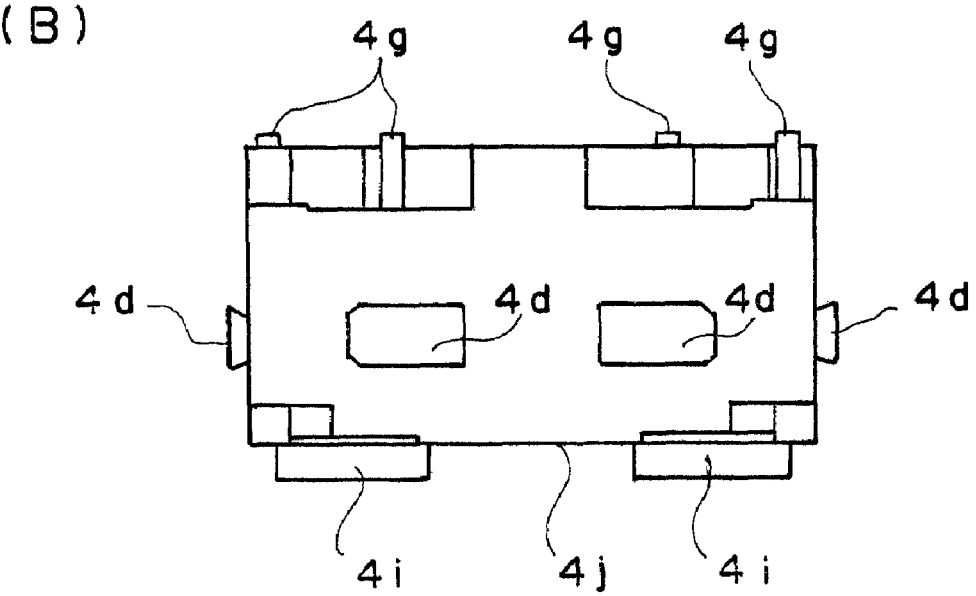
Figure 10:
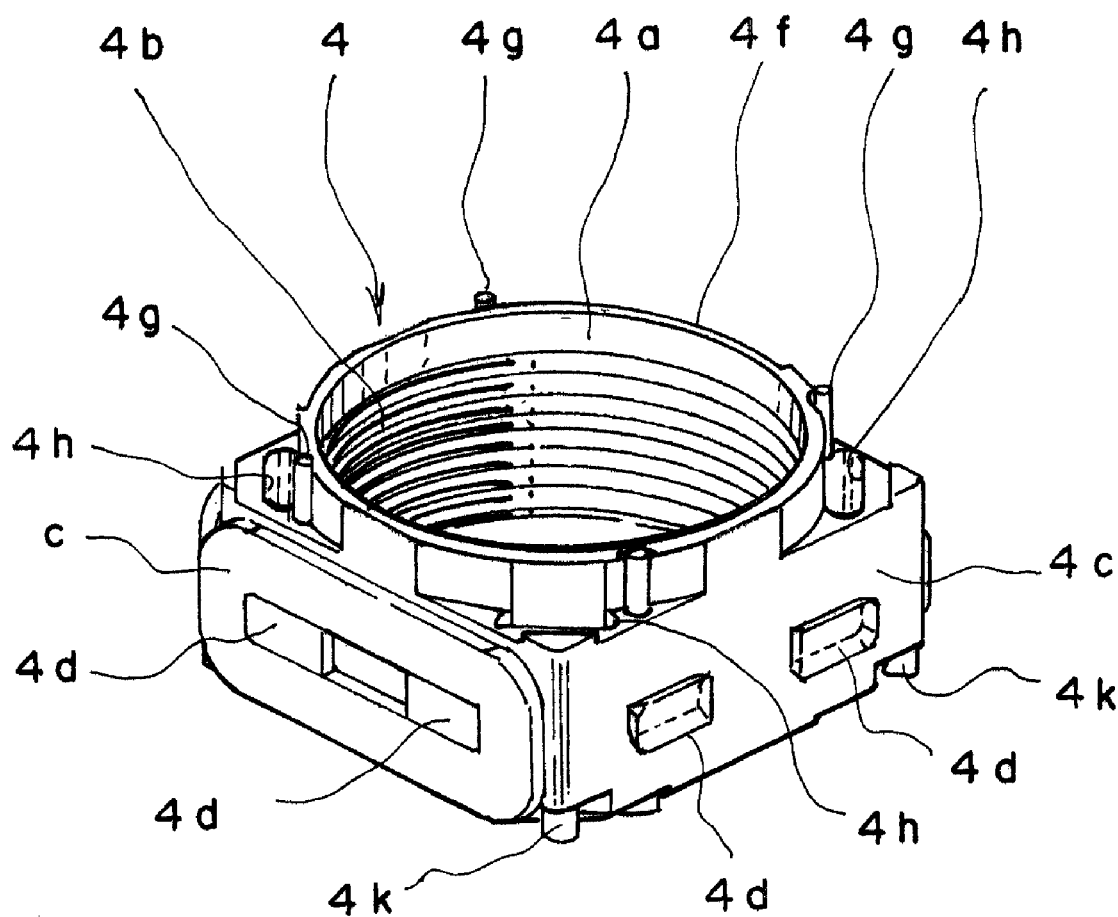
FIG. 10 is a perspective view of the coil base with some coils attached thereto.

As shown in FIGS. 9 and 10, the coil base 4 includes a cylindrical body having a quadrangular outline and a lens aperture 4*a* formed centrally of the cylindrical body. Lens mounting threads 4*b* are formed on the inner periphery of the lens aperture 4*a*. The whole of the coil base 4 is formed by molding with use of a synthetic resin. Two projections 4*d* are formed on each of outer faces 4*c* of the cylindrical body having a quadrangular outline. The projections 4*d* are each formed so as to be thin at a base portion thereof and thick on an outer side thereof. For example, an outer surface of each projection 4*d* is tapered with a rising gradient to enlarge the outside diameter.

Coils C are wound round the outer peripheries of the projections 4*d* in such a manner that each coil C is wound round two projections 4*d* formed on each outer face 4*c* of the cylindrical body.

In this case, when a predetermined number of turns have been wound in one place, the cylindrical body is rotated 90° and another coil C is wound on the next outer face 4*c*.

In this way coils are wound successively on the projections 4*d* formed on the four outer faces 4*c* and, in a mounting process to be described later, terminals of the coils are mounted for example by soldering to the end portions 2*g* of the inner spring pieces 2*a* of the electrically conductive springs 2.

The portion of the mounting threads 4*b* of the coil base 4 includes an upright cylinder 4*f* and four small cylinders 4*g* formed at equal intervals on the outer periphery of the cylinder 4*f*. Further, in the four corners of the cylindrical body of the coil base 4, deep, elongated, rectangular holes 4*h* are formed in parallel with an optical axis direction so as to contact the outer periphery side of the upright cylinder 4*f*.

Figure 12:
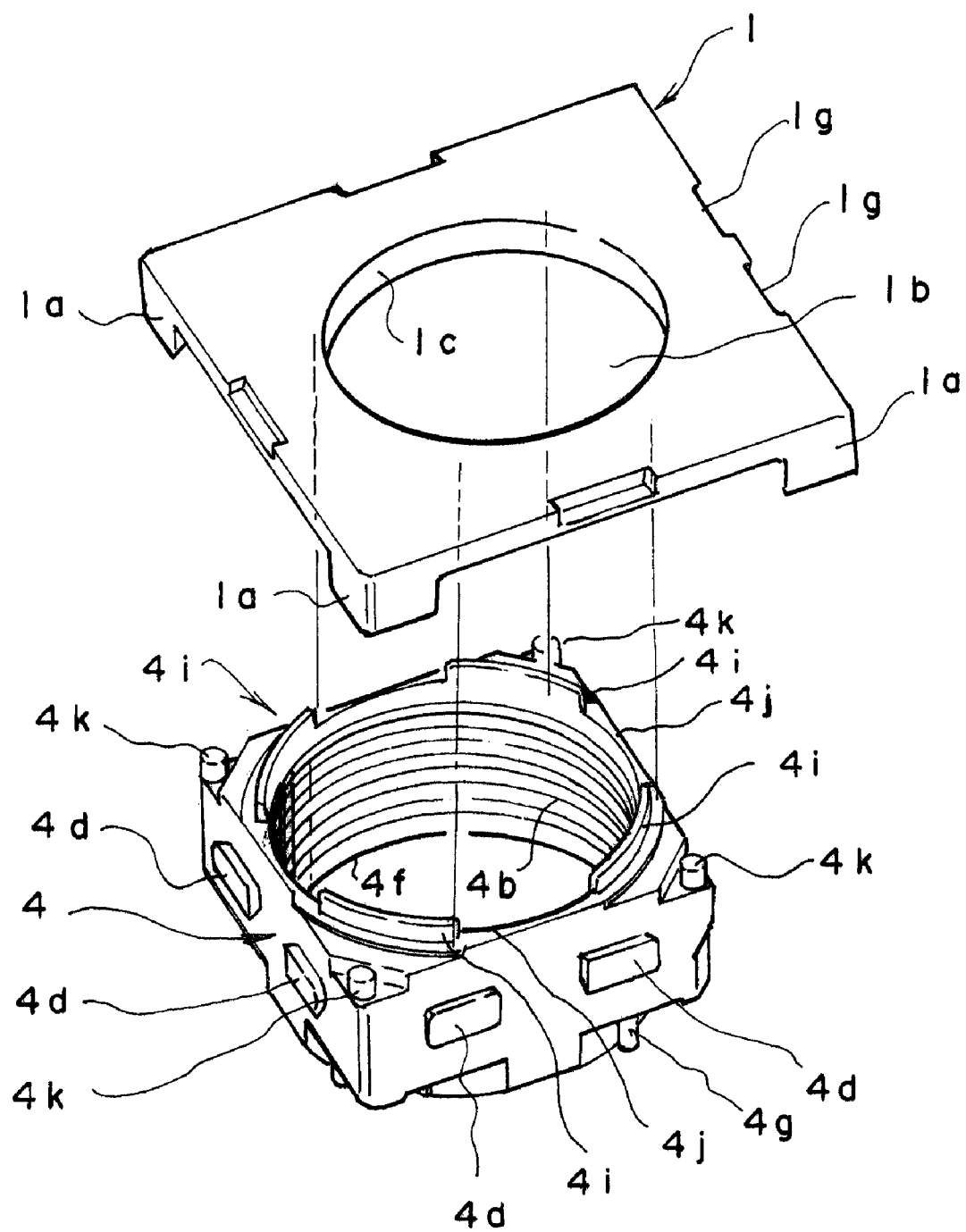
FIG. 12 is a perspective view showing a state of which a base and the coil base are about to be assembled together.

On the other hand, as shown in FIG. 12, on an upper surface of the cylindrical body on the side opposite to the aforesaid side in the optical axis direction of the coil base 4, in other words, on a lower surface side of the coil base 4 shown in FIG. 2, four arcuate upright projecting pieces 4*i* partially extending contiguously to the lens mounting threads 4*b* are formed at equal intervals. Flat faces 4*j* are formed outside the projecting pieces 4*i*. Small guide pins 4*k* are erected outside the flat faces 4*i* and on the four corners of the cylindrical body. Upon assembly, the arcuate projecting pieces 4*i* are fitted in the arcuate grooves 1*d* of the base 1.

Figure 4:
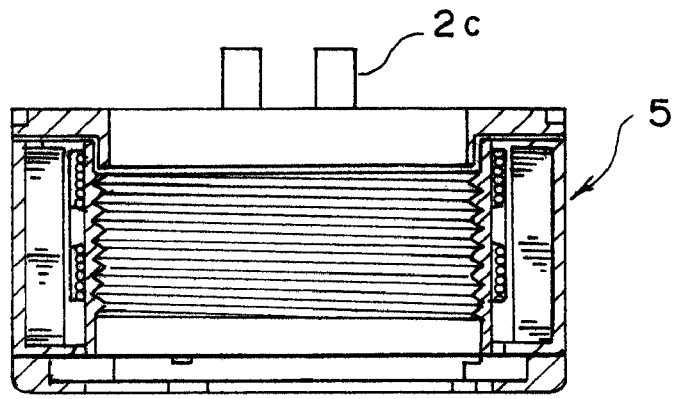
FIG. 4 is a plan view in cross section taken on line A-A in FIG. 3.
Figure 5:
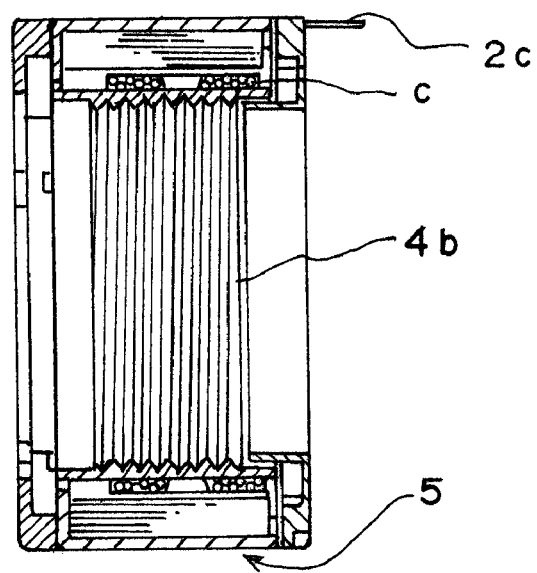
FIG. 5 is a side view in vertical section taken on line B-B in FIG. 3.
Figure 6:
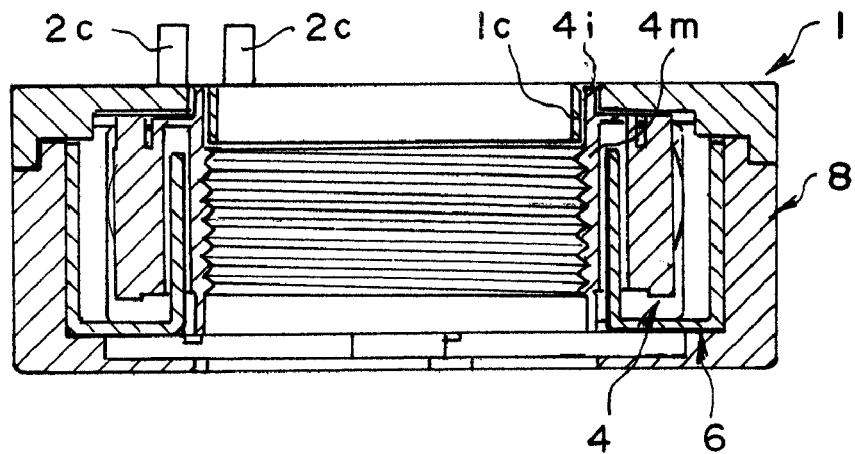
FIG. 6 is a sectional view taken on line C-C in FIG. 3.

The magnets 5, which are four magnets as sown in FIGS. 1 and 4, are magnetized as permanent magnets and are attached and fixed to four-side inner walls, respectively, of the yoke 6 formed by a thin metallic plate of a magnetic material.

As shown in FIGS. 1 and 2, the yoke 6 is made up of a bottomed quadrangular prism-like box having one lower surface (the lower surface in FIG. 2) and a bottom (the upper surface in FIG. 2) in the optical axis direction, the lower surface being open and a lens aperture 6*a* being formed centrally of the bottom, bent portions 6*b* bent straight downward from four corners of the bottom and cut-in portions 6*d* formed in lower ends (upper ends in FIG. 1) of the four corners of the box on the side opposite to the bent portions 6*b*.

The fixed magnets 5 are attached to inside portions of the four sides of the box and the movable unit is disposed within the box in such a manner that the coils C are opposed to the magnets 5.

The corners of the box in the yoke 6 have faces 6*c* chamfered at an angle of 45° relative to the four side walls. Along the insides of the faces 6*c* the bent portions 6*b* are erected from the bottom. Likewise, square cut-in portions 6*d* are formed in the open-side ends of the faces 6*c*. The square cut-in portions 6*d*, which are formed precisely, are fitted on the semicircular projections 1*e* formed on the base 1 and serve as a mounting position reference for allowing the entire assembly to exhibit its performance.

Figure 7:
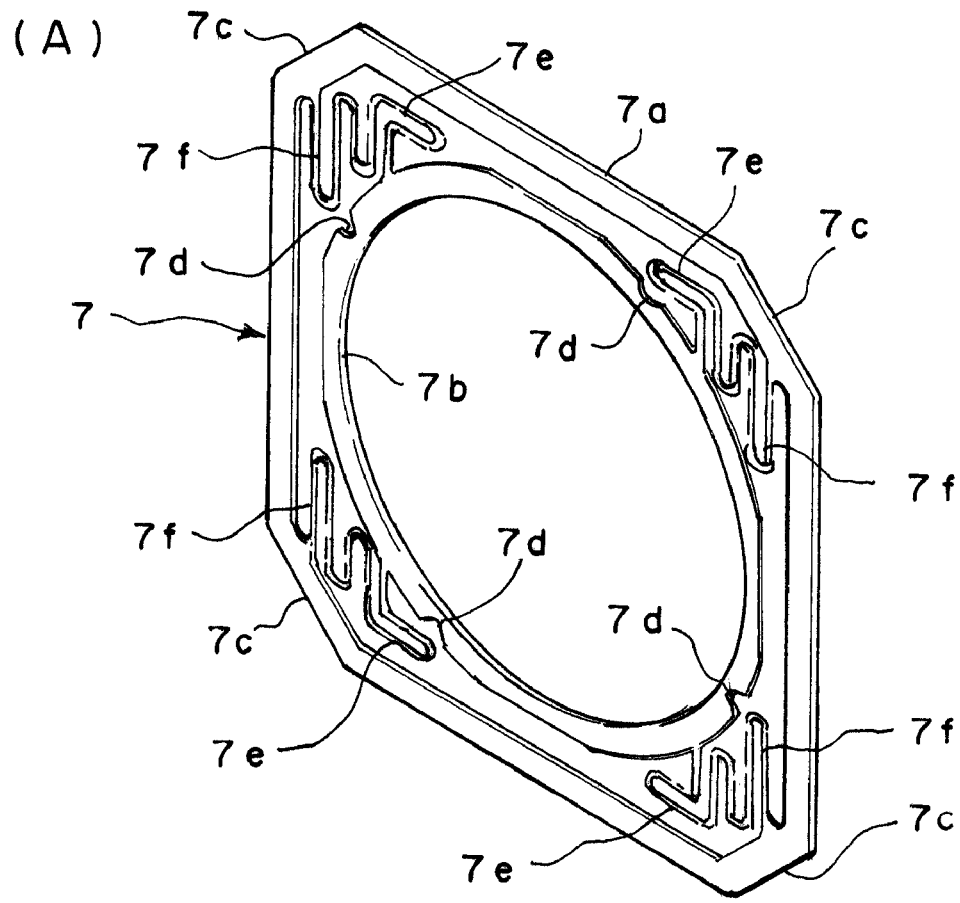
FIG. 7(A) is a perspective view of a leaf spring and FIG. 7(B) is a partial enlarged perspective view of the leaf spring.
Figure 7:
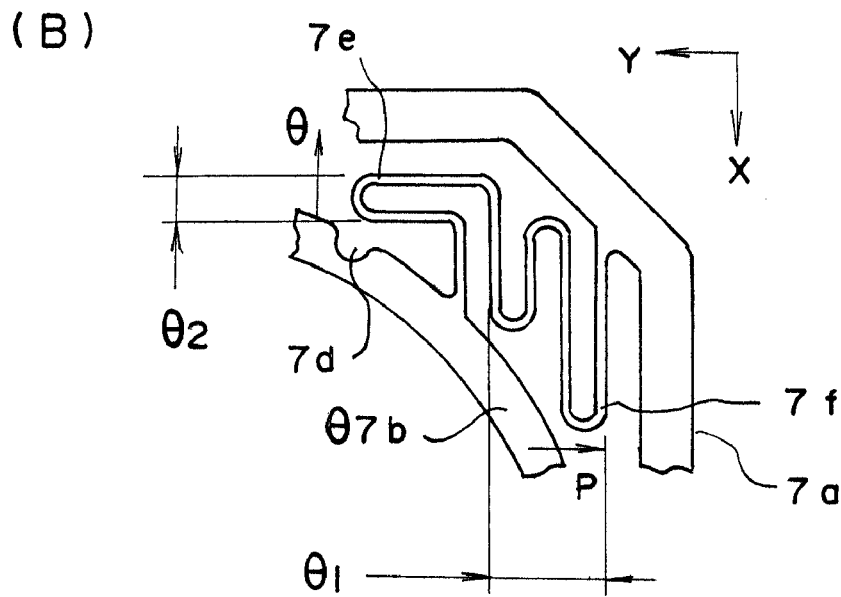

The leaf spring 7, like the electrically conductive springs 2, is formed by a thin plate of a material having electrical conductivity and superior in resilience, e.g., phosphor bronze. As shown in FIG. 7, the leaf spring 7 is formed by a single part and is made up of a thin spring frame 7*a* which is quadrangular on its outer edge side, a thin spring ring 7*b* which is circular on its inner edge side, and resilient wires for connection between the spring frame 7*a* and the spring ring 7*b*.

The four corners of the quadrangular outer spring frame 7*a* are formed by slant faces 7*c* which are chamfered at an angle of 45° so as to serve as a mounting guide and four semicircular recesses 7*d* also serving as a mounting guide are formed at equal intervals in the outer periphery of the inner spring ring 6*b*.

Like the electrically conductive springs 2, the aforesaid connecting wires are each made up of a horizontal curvilinear portion 7*e* connected at one end thereof the inner spring ring 7*b* and repeating U-turn and a vertical curvilinear portion 7*f* connected at an opposite end thereof to the outer spring frame 7*a* and repeating U-turn. Also in this case, as is the case with the electrically conductive springs 2, the curvilinear portions 7*e* and 7*f* are displaced at a crossing angle of 90°.

As shown in FIGS. 1 and 2, the cover frame 8 is made up of a plate-like body 8*d* formed in a quadrangular shape by molding with use of synthetic resin, four support rods 8*a* erected downward in FIG. 2 on the four corners of the body 8*d*, and a lens aperture 8*b* formed centrally of the body 8*d*. The support rods 8*a* are each formed as a rectangular equilateral triangular prism having an internal angle of inclination of 45°. Semicircular projections 8*c* serving as connections are formed on lower end (upper ends in FIG. 1) of the four support rods 8*a*.

A detailed description will now be given about in what order these components are assembled. Basically, as shown in FIG. 1, the leaf spring 7, yoke 6, magnets 5, coil base 4, washer 3, electrically conductive springs 2 and base 1 are stacked in this order within the cover frame 8.

First, the spring 7 is mounted so that the slant faces 7*c* at the corners match respectively and contact the slant faces of the support rods 8*a* of the cover frame 8, then the yoke 6 is inserted within the cover frame 8 so that the lens aperture 6*a* faces down while matching the corner slant faces 6*c* with the slant faces of the support rods 8*a*. Thus, the leaf spring 7 is held in a sandwiched fashion in between the cover frame 8 and the yoke 6.

Next, the four magnets 5 are attached and fixed to the inner peripheries of the side walls of the yoke 6. In this case, since the magnets 5 are magnetized as permanent magnets and the yoke 6 is also formed of a magnetic material, it suffices to keep both stuck together.

Then, the movable unit M1 is inserted into the yoke 6. More specifically, the movable unit M1 is constituted beforehand by the coil base 4 and the coils C wound on the four outer periphery faces of the cylindrical body of the coil base 4. The movable unit M1 thus constituted is inserted through the inside space of the magnets 5 into the yoke 6 and is mounted so that the four coils C are opposed to the fixed magnets 5 respectively. In this case, the rectangular holes 4*h* formed in the four corners of the coil base 4 are fitted on the inside bent portions 6*b* of the yoke 6. That is, the movable unit M1 is mounted with the inside bent portions 6b of the yoke 6 as guide and, in operation, it moves along the bent portions 6b.

By adopting such a mounting method, the movable unit M1 with coils C wound on the coil base 4 as above is relatively improved in dimensional accuracy, so that it is possible to ensure a stable distance between the coils C and the magnets 5 while maintaining a small gap between the two. Consequently, it is possible to develop a magnetic field by energization of the coils C and obtain a stable and strong repulsive force between the coils and the magnets 5.

In this case, if the movable unit M1 is mounted with the bent portions 6b as guide, the cylindrical portion 4f formed on the lower side (the upper side in FIG. 2) of the coil base 4 comes to be fitted in the inside spring ring 7b of the leaf spring 7 in opposition to the same spring ring and at the same time the small cylinders 4g are fitted in the recesses 7d of the leaf spring 7.

Next, the washer 3 and the two electrically conductive springs 2 are put in this order onto the flat faces 4j of the coil base 4. The washer 3 is disposed in such a manner that the recesses 3b formed in the four corner portions become opposed to the insides of the support rods 8a of the cover frame 8. The two electrically conductive springs 2 are disposed in such a manner that the inside guide portions 2h are fitted on the four arcuate guide pins 4k of the coil base 4.

Then, the terminals of the coils C are soldered respectively to the inner end portions 2g of the two electrically conductive springs 2. The washer 3 is formed of an insulating material and thus electrical insulation is ensured lest the coils C and the electrically conductive springs 2 should come into accidental contact with each other and cause electric conduction. The above mounting process may be completed beforehand in the state of the movable unit M1.

Lastly, the base 1 is mounted, whereby the entire unit is completed. In this mounting process, the support rods 1a of the base 1 and the support rods 8a of the cover frame 8 are abutted against each other. Then, the semicircular projections 8c formed on the support rod tips of the cover frame 8 are fitted in the recesses 1f formed in the support rods 1a of the base 1.

At this time, the semicircular projections 1e formed inside the support rods 1a of the base 1 are fitted in the square cut-in portions 6d formed in the corner slant faces of the yoke 6 and are also fitted in the recesses 3b of the washer 3 and the recesses 2d of the electrically conductive springs 2. Further, the faces 6c chamfered in the corners of the yoke 6 are fitted inside the support rods 8a of the cover frame 8 and are thereby restricted positionally, thus effecting alignment with the base 1.

Therefore, the movable unit M1 is controlled to maintain its positional accuracy with respect to the cover frame 8 and the base 1 along the yoke 6 and it becomes possible to ensure a highly accurate and smooth operation of the same unit. That is, the semicircular projections 1e formed inside the support rods 1a of the base 1 are fitted in the square cut-in portions 6d formed in the corner slant faces of the yoke 6 and are also fitted inside the support rods 8a of the cover frame 8 and are thereby restricted positionally, thus effecting alignment with the base 1. When a check of the final assembled state is over, an adhesive is applied to the connection between the cover frame 8 and the base 1 or an adhesive tape is affixed to the outer periphery portion of the connection. Now, the coupling of the two is completed and hence the lens drive assembly is completed.

Thus, since the parts requiring positional accuracy are directly joined together and mounted, it is possible to diminish an allowance based on respective parts' errors, thereby maintain a relative position of the movable unit with respect to the whole of the lens drive assembly at the reference position and implement a highly accurate construction.

In such a joined state, the L-shaped support pieces 2c of the electrically conductive springs 2 project from the cutout portions 1g of the base 1.

A detailed description will now be given about a method for operating the lens drive assembly of this embodiment constructed as above. An output signal from a lens control circuit (a known circuit, not shown) is input to the L-shaped support pieces 2c of the electrically conductive springs 2, whereby an electric current is supplied to the coils C and a magnetic field based on Fleming's left-hand rule is created in the coils C.

With the magnetic field thus created in the coils C, a repulsive force acts between the said magnetic field and the magnetic field of the magnets 5 which are attached to the yoke 6 in opposition to the coils C, so that the movable unit M1 moves by the distance corresponding to the output signal provided from the lens control circuit. In this way it is possible to effect a predetermined lens focus position control. That is, a subject image ray incident from the cover frame 8 side can properly form an image on a light receiving element disposed behind the base 1.

In this case, when the coils C are not energized, the electrically conductive springs 2 and the leaf spring 7 impart a preload to the movable unit M1 to urge the same unit toward the base. The thin portions of both springs 2, 7 are formed long so as to minimize a change of elastic force even upon energization of the coils C and consequent movement of the movable unit M1.

Further, since the electrically conductive springs 2 and the leaf spring 7 are respectively formed with the curvilinear portions 2e, 7e each connected at one end to the inside and repeating U-turn and the curvilinear portions 2f, 7f each connected at the opposite end to the outside and repeating U-turn, respectively at plural positions of a circumference directions in a sole plane, it is possible to let both springs function to minimize rotation of the movable unit M1 on its own axis and tilting thereof with movement of the same unit.

This is presumed to be because the curvilinear portions 2e, 7e and the curvilinear portions 2f, 7f expand or contract in arrow P or Q direction or perform a turning displacement in an angle θ direction. Further, the curvilinear portions 2e, 7e and the curvilinear portions 2f, 7f, at adjacent corner portions, function to attenuate the turning motion of the movable unit M1 and therefore it is possible to deaden oscillation quickly.

Figure 15:
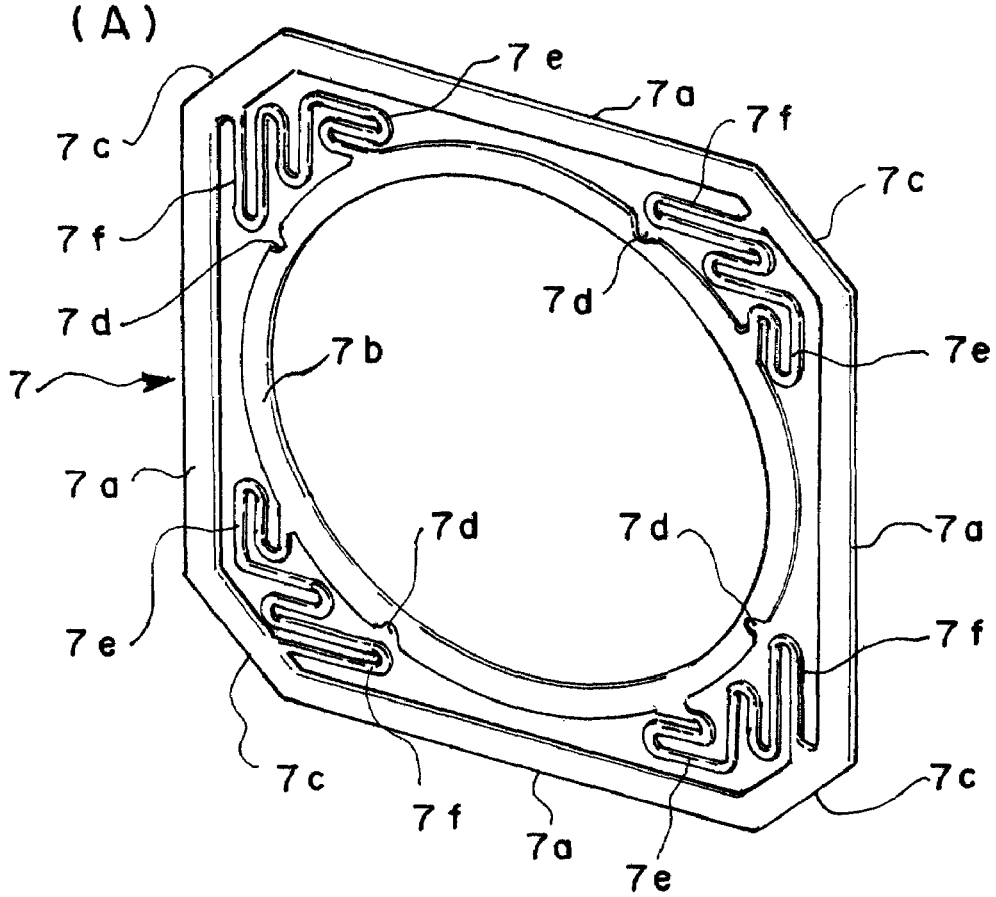
FIGS. 15(A) and 15(B) are a perspective view and a partial enlarged perspective view, respectively, of a leaf spring in another embodiment of the present invention.
Figure 15:
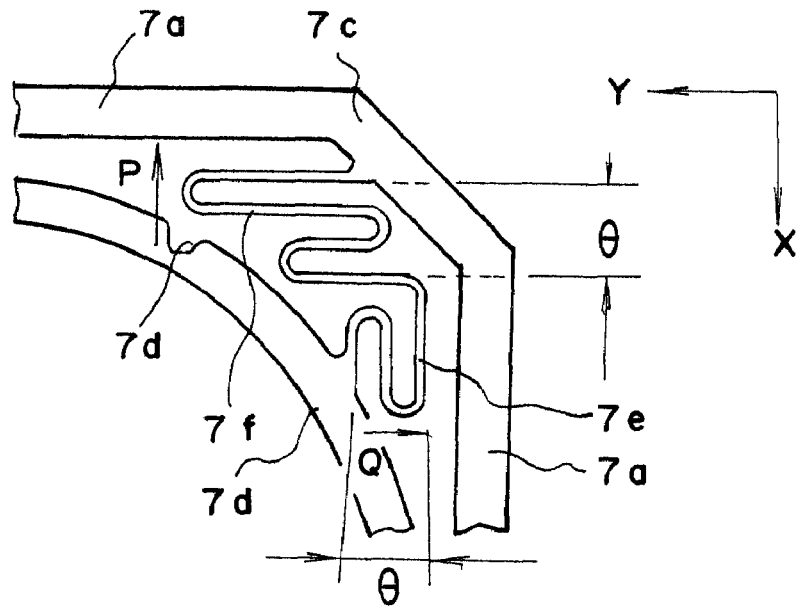
Figure 16:
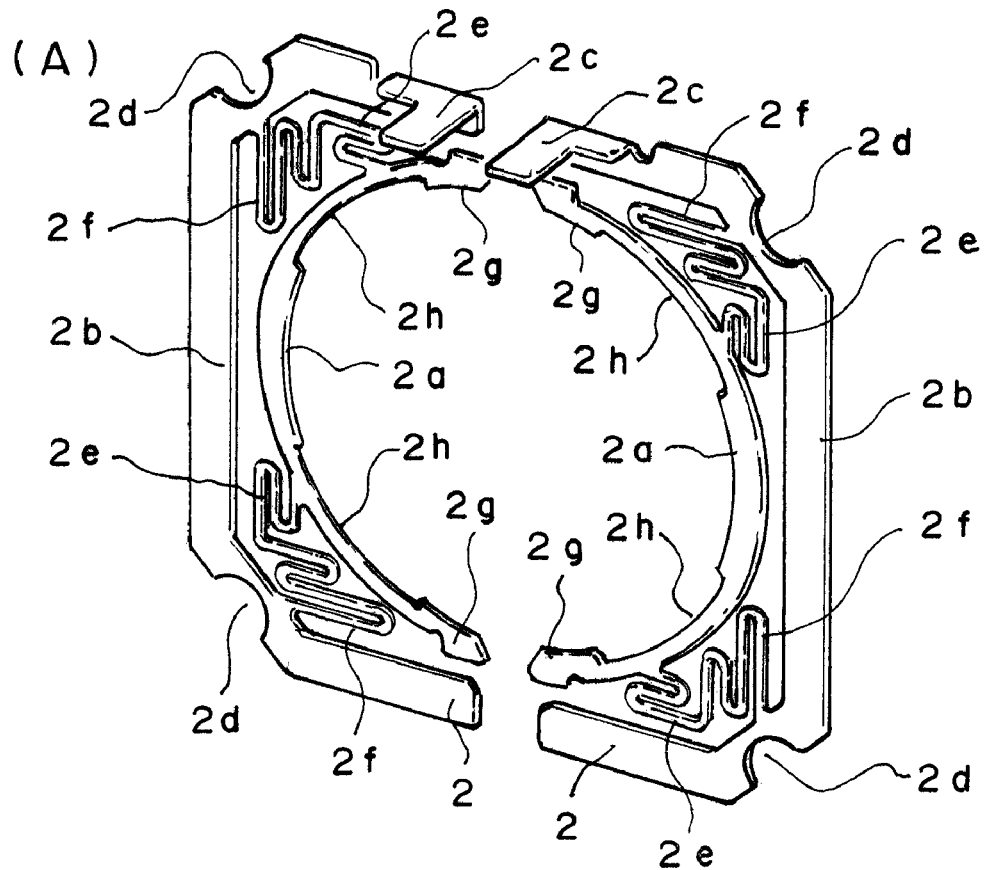
FIGS. 16(A) and 16(B) are a perspective view and a partial enlarged perspective view, respectively, of an electrically conductive spring in a further embodiment of the present invention.
Figure 16:
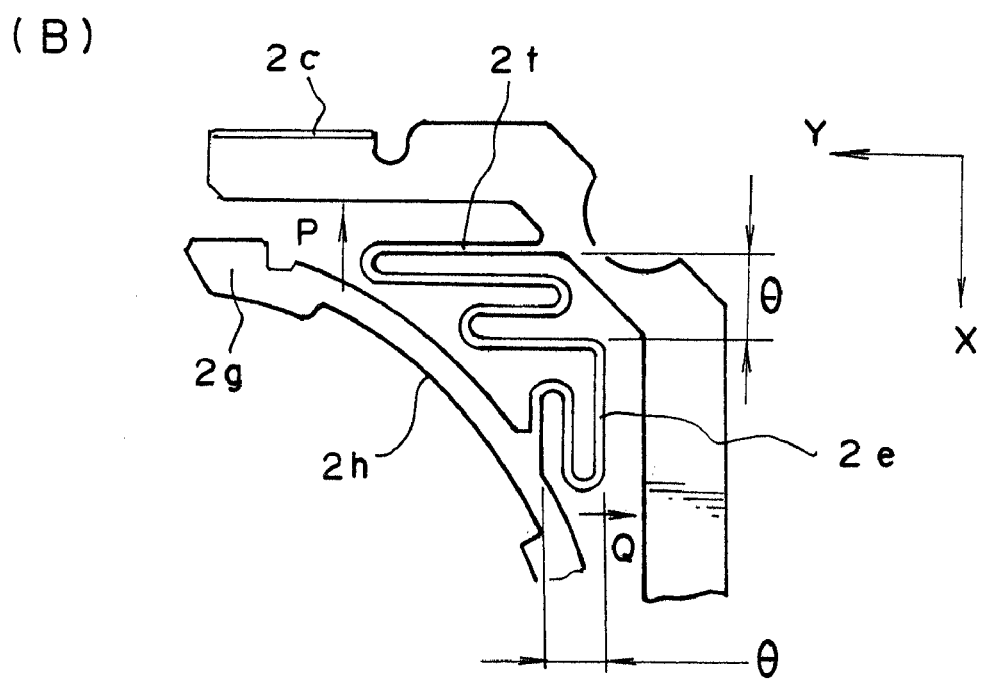
Figure 17:
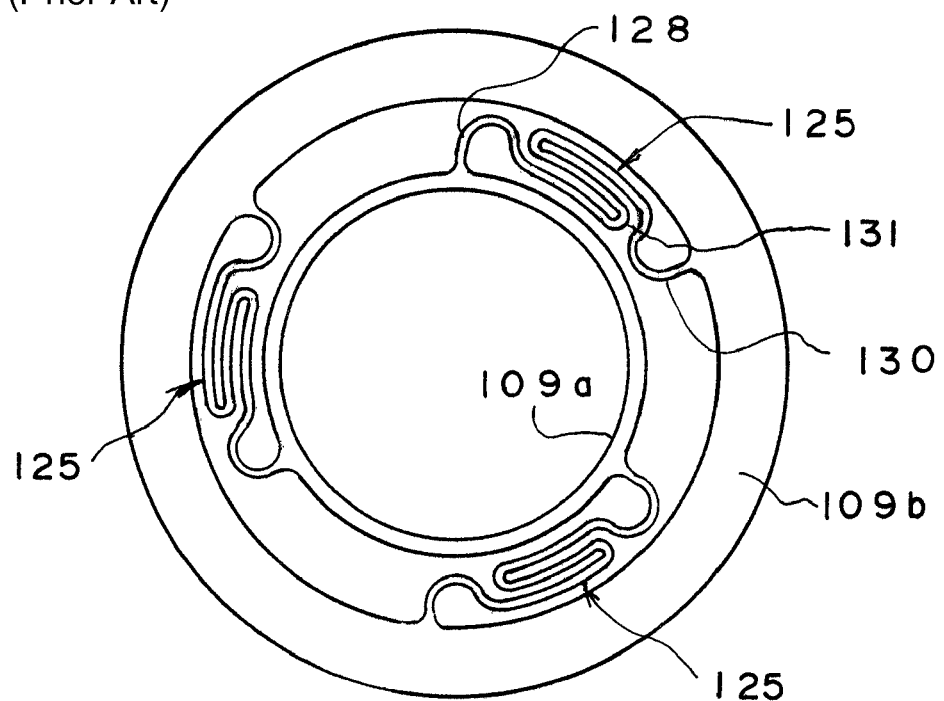
FIG. 17 is a plan view of a conventional spring.
Figure 18:
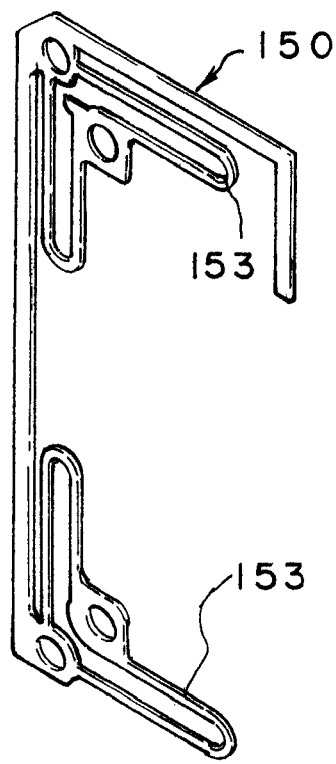
FIG. 18 is a partial enlarged perspective view of another conventional spring.

FIGS. 15 and 16 illustrate a leaf spring 7 and electrically conductive springs 2 according to other embodiments of the present invention, in which mounting positions of curvilinear portions are different from those shown in the above embodiment. In FIG. 15, a horizontal curvilinear portion 7f located on an upper side of a leaf spring 7 is connected to a body 7a and a vertical curvilinear portion 7e is connected to a spring ring 7b. Likewise, a horizontal curvilinear portion 2f of an electrically conductive spring 2 is connected to a spring body 2b and a vertical curvilinear portion 2e is connected to a spring piece 2a side.

Although curvilinear wires of a pair of electrically conductive springs 2 shown in FIG. 16 are arranged alternately, they may be arranged symmetrically.

A resonance phenomenon damping state changes because the oscillation system of the movable unit M1 differs depending on the moving speed and weight of the same unit, so correspondingly to this change it is intended in this embodiment to change the state of absorption of the oscillation system in order to quickly attenuate the turning motion of the movable unit M1.

Thus, there is a case where the moving speed is changed due to a change in the total weight of the movable unit M1 depending on the lens which is loaded. Actually, therefore, there may be adopted a suitable combination of position and shape of curvilinear portions according to circumstances such as, for example, a combination of FIGS. 7 and 11, FIGS. 15 and 16, FIGS. 7 and 16, or FIGS. 11 and 15.

Moreover, in the two electrically conductive springs 2 and leaf spring 7 described above, the curvilinear portions 2e, 7e each connected at one end to the inside and repeating U-turn and the curvilinear portions 2f, 7f each connected at an opposite end to the outside and repeating U-turn are formed at a crossing angle of, say, 90°. However, no limitation is made thereto and the said angle may be changed as necessary.

Further, although in the above embodiments the electrically conductive springs 2 are formed in a pair of bisected right and left springs, both may be formed as an integral construction. In this case, one conductive terminal is provided in the electrically conductive spring 2 and the other conductive terminal is drawn out from the leaf spring 7.

The present invention is not limited to the above embodiments, but changes may be made as necessary within the technical scope of the present invention.

What is claimed is:

1. A voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising:
a lower base;
an electrically conductive spring disposed on the base;
a metallic yoke disposed on the electrically conductive spring;
magnets mounted within the yoke;
a movable unit inserted into the yoke in opposition to the magnets;
a leaf spring disposed on the yoke; and
an upper cover frame coupled to the base while being superimposed on the leaf spring,
the electrically conductive spring comprising an outer spring body, a thin spring piece formed inside the spring body, and a spring wire, the spring wire comprising a curvilinear portion connected at one end to the inner spring piece and repeating U-turn and another curvilinear portion connected at an opposite end to the outer spring body and repeating U-turn, respectively at plural positions of a circumference direction in a sole plane, the two curvilinear portions being disposed at a mutually intersecting angle,
the leaf spring comprising a thin quadrangular spring frame located on an outer edge side, a thin circular spring ring located on an inner edge side, and a spring wire, the spring wire comprising a curvilinear portion connected at one end to the spring ring and repeating U-turn and another curvilinear portion connected at an opposite end to the spring frame and repeating U-turn, respectively at plural positions of a circumference direction in a sole plane.

2. A lens drive assembly comprising:
a base;
an electrically conductive spring disposed on the base, the electrically conductive spring comprising an outer spring body forming an interior region, a thin spring piece disposed inwardly of the spring body in the interior region, and a spring wire comprising plural U-turn curved portions connected to linear portions including linear portions extending in a first direction and linear portions extending in a second direction intersecting said first direction, the spring wire having two connection ends including an end connected to the inner spring piece and an end connected to the outer spring body, the outer spring body, the inner spring piece and the spring wire being provided in a single plane as an integral single part;
a metallic yoke disposed on the electrically conductive spring;
magnets mounted within the yoke;
a movable unit inserted into the yoke in opposition to the magnets;
a leaf spring disposed on the yoke the leaf spring comprising an outer edge quadrangular spring frame, a thin circular spring ring located on an inner edge side, and a spring wire, the spring wire comprising curved portions connected to linear portions, the spring wire having two connection ends including an end connected to the spring frame and an end connected to circular spring ring, the spring frame, the spring ring and the spring wire being provided in a single plane as an integral single part; and
an upper cover frame coupled to the base and disposed adjacent to the leaf spring.

* * * * *